United States Patent [19]

McCullough, Jr.

[11] Patent Number: 4,535,125

[45] Date of Patent: Aug. 13, 1985

[54] HIGH FLOW PROPYLENE POLYMER COMPOSITIONS

[75] Inventor: J. Douglas McCullough, Jr., Houston, Tex.

[73] Assignee: Shell Oil Company, Houston, Tex.

[21] Appl. No.: 541,624

[22] Filed: Oct. 13, 1983

[51] Int. Cl.³ .................... C08L 23/26; C08L 53/00
[52] U.S. Cl. ........................................ 525/88; 525/194
[58] Field of Search .................................... 525/88

[56] References Cited

U.S. PATENT DOCUMENTS

| | | | |
|---|---|---|---|
| 3,200,173 | 8/1965 | Schilling | 260/878 |
| 3,207,739 | 9/1965 | Wales | 260/93.7 |
| 3,268,499 | 8/1966 | Wales | 260/93.7 |
| 3,318,976 | 5/1967 | Short | 260/878 |
| 3,514,501 | 5/1970 | Liebson et al. | 260/878 |
| 3,937,758 | 2/1976 | Castagna | 525/88 |
| 4,375,531 | 3/1983 | Ross | 525/93 |

Primary Examiner—Carman J. Seccuro
Attorney, Agent, or Firm—Dean F. Vance

[57] ABSTRACT

Visbroken blends of sequentially polymerized ethylene-propylene copolymers and linear low density polyethylene possess extremely good impact resistance along with high melt flows without excessive loss of stiffness.

12 Claims, No Drawings

HIGH FLOW PROPYLENE POLYMER COMPOSITIONS

BACKGROUND OF THE INVENTION

1. Field of the Invention

This invention relates to modified propylene polymer compositions of improved flow and impact resistance. More particularly, the invention relates to visbroken blends of sequentially polymerized propylene copolymers with linear low density ethylene copolymers.

2. Description of the Prior Art

Polypropylene is a well known commercial polymer, used for a variety of products such as packaging films and extruded and molded shapes. It is produced by polymerization of propylene over transition metal coordination catalysts, specifically titanium halide containing catalysts. Commercial polypropylene is deficient in resistance to impact at low temperatures, i.e., 0° C. and below. It is known that incorporation of some elastomers, particularly elastomeric copolymers of ethylene and propylene, improves the low temperature impact resistance of polypropylene.

One method of incorporating elastomeric ethylene-propylene copolymers into polypropylene is by sequential polymerization of propylene and ethylene-propylene mixtures. In typical processes of this kind, propylene homopolymer is formed in one stage and the copolymer is formed in a separate stage, in the presence of the homopolymer and of the original catalyst. Multiple stage processes of this type are also known. Products of such sequential polymerization processes are sometimes referred to as "block copolymers" but it is now understood that such products may rather be intimate blends of polypropylene and ethylene-propylene elastomer. The products of such sequential polymerization of propylene and ethylene-propylene mixtures, are referred to herein as sequentially polymerized propylene-ethylene copolymers or as in-situ produced copolymers. To maintain separate terminology for the total sequentially polymerized copolymer composition and the elastomeric copolymer fraction thereof, the total copolymer composition is referred to as impact-improved propylene-ethylene copolymer which has a specified content of an elastomeric ethylene-propylene copolymer fraction and which is the product of sequential polymerization of propylene and a propylene-ethylene mixture.

Methods for producing impact-improved, sequentially polymerized propylene-ethylene copolymers are well known. See, for example, "Toughened Plastics" by C. B. Bucknall, Applied Science Publishers Ltd. 1977, pp. 87-90, and T. G. Heggs in *Block Copolymers*, D. C. Allport and W. H. James (eds), Applied Science Publishers Ltd. 1973, chapter 4. Representative U.S. patents describing such methods are: U.S. Pat. No. 3,200,173—Schilling; U.S. Pat. No. 3,318,976—Short; and U.S. Pat. No. 3,514,501—Leibson et al.

These impact-improved, sequentially polymerized propylene-ethylene copolymers are sometimes blended with other polymers to improve certain properties. In some cases these impact copolymers are blended with polymers such as high density polyethylene (HDPE) or low density polyethylene (LDPE). See, e.g., the patents cited in the Description of the Prior Art in copending patent application, Ser. No. 444,754, filed Nov. 26, 1982, now U.S. Pat. No. 4,459,385, having a common assignee, and U.S. Pat. No. 4,375,531. The blends covered in the above-mentioned patent application are blends of impact propylene copolymers and linear-low density ethylene copolymers. Such blends have extremely good impact resistance without excessive loss of stiffness. While such blends are useful in applications requiring high impact resistance, there are applications that require improved flow performance and fabricating performance. It is known by those familiar with the manufacture of propylene polymers that production of high flow polymers in the reactor may be difficult due to chain transfer limitations, and the products thereof may suffer embrittlement. Visbreaking in extrusion equipment provides an alternative route to high flow without these adverse effects. Accordingly, we have now discovered a new composition that has such improved flow performance as obtained through visbreaking with peroxide, along with retention of substantial impact resistance.

SUMMARY OF THE INVENTION

The present invention deals with compositions having not only excellent flow characteristics, but also possessing excellent impact strengths (especially at low temperature) along with ease of manufacture. Specifically, the present invention deals with compositions having melt flows between about 5 and about 50 dg/min (ASTM D1238-Condition L), and high impact values, said compositions being obtained by visbreaking the blend of 50-95% by weight of an impact-modified propylene polymer and 5-50% by weight of a linear low density ethylene copolymer, wherein:

(a) said impact-modified propylene polymer has a melt flow (ASTM D1238-Condition L) of about 0.5-15 dg/min and an elastomeric propylene-ethylene copolymer content of 5-50% by weight, the copolymer fraction having an ethylene content of 30-95% by weight, which copolymer fraction is the product of an essentially random polymerization of a propylene-ethylene mixture over a titanium halide-containing coordination catalyst; and (b) said linear low density ethylene copolymer is the product of random polymerization of ethylene with up to 15 mole percent of at least one $C_3$-$C_8$ alpha olefin monomer over a transition metal-based coordination catalyst and which has a density in the range from 0.912 and 0.940 and a melt index (ASTM D-1238-Condition E) not exceeding 16.

DESCRIPTION OF THE INVENTION

This invention is directed to modified polypropylene polymer molding compositions which provide good low temperature impact resistance and high flow characteristics at acceptable levels of stiffness in extruded or injection molded articles.

Before discussing the invention further, reference is made to the methods of measuring impact resistance and stiffness, employed in this description.

Impact resistance may be measured by a variety of methods. A frequently employed method is the notched Izod impact test (ASTM D-256). This test shows some correlation with impact resistance as experienced in commercial use. Various falling weight type impact tests often correlate better with commercial applications. The falling weight method employed in this description is the Gardner impact test. In that method an impacting device having a ⅝ inch diameter rounded tip rests on the injection molded circular sample disc (125 mil thick) which is supported at the rim. The sample disc is one of a series from the same composition, which has, in this case, been cooled to −30° C. A weight is dropped on the impacting device from a variable measured height. The sample disc is replaced after each drop; the height from which the weight is dropped is varied until the breaking point of the series of discs is defined. The impact strength, reported in units of Joules, ft-lbs or in-lbs, is the product of the mass of the dropped weight and the height of drop at which 50% of the discs resist breaking.

The stiffness of test strips molded from various compositions is reported as the 1% secant flexural modulus, determined in a standard test (ASTM D790) performed at 0.05 inch per minute. Flexural modulus may be reported in units of megapascals (MPa) or pounds per square inch (psi).

As described in the prior art, it is known that the low temperature impact resistance of propylene homopolymers is deficient for uses where articles may be exposed to temperatures of 0° C. or below. Commercially, low temperature impact resistance of propylene polymers is improved by blending polypropylene homopolymers with certain elastomers, particularly ethylene-propylene copolymers, or with mixtures of such elastomers with high density polyethylene, or by introducing ethylene-propylene elastomer into the propylene polymer during polymerization by a sequential polymerization process. As a general rule, impact resistance increases with increasing amounts of elastomer in the total composition. One of the adverse effects of the addition of ethylene-propylene elastomer is the concomitant reduction in stiffness of the product, stiffness being one of the attractive properties of propylene homopolymer. The balance of impact and stiffness is critical in the judging of the performance of polypropylene molding and extrusion compositions. Even though the admixture of polyethylene to improve the impact resistance of polypropylene compositions, including sequentially polymerized propylene-ethylene copolymers, has been disclosed in patents issued as early as 1966, such compositions have apparently found no practical use in commerce.

Impact improved propylene polymers are often referred to in the trade as "medium impact", "high impact", and "extra high impact" polypropylene. Typical ranges of properties for commercial products of this type are as follows:

| Property | Medium Impact | High Impact | Extra High Impact |
| --- | --- | --- | --- |
| 1% Secant flexural modulus, MPa | 1000–1430 | 800–1200 | 700–1100 |
| Impact Strength (125 mil discs) | | | |
| Gardner at −30° C., J | 1–15 | 15–30 | 30–45 |
| Izod, notched, at 23° C., J/m | 60–100 | 100–300 | 300-No break |

Sequentially polymerized propylene-ethylene copolymers which are improved according to this invention are materials of commerce. They may be produced by sequential polymerization of propylene and propylene-ethylene mixtures by contact with Ziegler-Natta coordination catalysts, specifically those in which the transition metal is titanium, by well known methods. Such methods are described, for example, in the literature cited above. The catalysts generally employed in commercial processes are combinations of a violet $TiCl_3$ composition with an aluminum alkyl compound such as diethyl aluminum chloride. Newer types of coordination catalysts, such as compositions of $TiCl_4$ supported on magnesium chloride and modified with an electron donor, which are used with an aluminum trialkyl cocatalyst and a selectivity control agent such as an aromatic ester, may also be used to produce the sequentially polymerized copolymers.

The sequentially polymerized propylene-ethylene copolymers should have compositions and properties in the following ranges:

| | Suitable | Preferred | Best |
| --- | --- | --- | --- |
| Homopolymer, % Weight | 50–95 | 80–95 | 85–92 |
| Ethylene-Propylene Copolymer, % Weight | 50–5 | 20–5 | 15–8 |
| Ethylene Content of Copolymer Fraction, % Weight | 30–95 | 40–70 | 45–65 |
| Melt Flow, dg/min | .5–15 | .5–15 | .5–15 |

Linear low-density polyethylenes which may be blended with said propylene-ethylene copolymers according to this invention are random copolymers of ethylene with 1–15% by mole, and typically with no more than 10%, of higher alpha-olefin co-monomer, e.g., propylene, n-butene-1, n-hexene-1, n-octene-1 or 4-methylpentene-1, produced over transition metal coordination catalysts. As shown in the examples which follow, a much preferred comonomer is 1-butene. Such polymers are commercially available. Commercial products generally are produced in liquid phase or vapor phase polymerization processes. LLDPE polymers suitable for use in this invention should have properties in the following ranges:

| | Suitable | Preferred | Best |
| --- | --- | --- | --- |
| Melt Index, dg/min (ASTM D1238 Cond. E) | 1–16 | 1–12 | 1–7 |
| Density, g/cc | 0.912–0.940 | 0.917–0.940 | 0.917–0.935 |
| Tensile Properties (ASTM D638) | | | |
| Yield, MPa | 8–17 | 8–15 | 8–12 |
| Break, MPa | 8–25 | 10–25 | 15–25 |
| Elongation at Break, % | 100–1200 | 400–1200 | 600–1200 |
| Brittleness Temp., °C. | <−80 | <−80 | <−80 |

The blended compositions of this invention contain sequentially polymerized propylene-ethylene copolymer and LLDPE in the following proportions:

| | Suitable | Preferred | Best |
| --- | --- | --- | --- |
| Copolymer % w | 50–95 | 70–90 | 80–88 |
| LLDPE % w | 50–5 | 30–10 | 20–12 |

It will be understood that the proportions of components as well as the properties of the blended component may be selected to provide the best balance of properties and cost for any particular intended use. In some cases a lower performance level may be relatively satisfactory and may be commercially preferred if it can be achieved at a lower cost. Generally, the cost of LLDPE is lower than that of sequentially polymerized propylene-ethylene copolymer.

A critical aspect of the present invention is the visbreaking or peroxide reacting of the components in an extruder. Peroxide-reacting refers to the process of contacting the polymer blend (impact propylene-ethylene sequential copolymer+LLDPE) in an extruder in the presence of a small but effective amount of a free-radical initiator (i.e., a peroxide). Standard techniques for the peroxide cracking of polymers in an extruder are well known and include the processes disclosed in U.S. Pat. No. 3,144,436 and U.S. Pat. No. 3,887,534. Preferred peroxides are those which have relatively high decomposition temperatures and produce volatile decomposition products, the latter being relatively non-toxic and with minimal residual odor. The peroxide of choice is 2,5-dimethyl-2,5-bis(t-butylperoxy)hexane. Other peroxides of interest include those which have half-lives of decomposition of the order of seconds at the reaction temperature (about 230° C.) but which are safely stable at storage and ambient temperature. Decomposition products should preferably be volatile and relatively non-toxic. Many peroxides fit this category and choice is determined by economic considerations and physical form of the peroxide relative to efficiency of utilization. Many of the peroxides that are compatible with this invention are dialkyl peroxides but are not limited to this class. Specific examples are dicumyl peroxide, di-t-butyl peroxide, t-butyl cumyl peroxide and 2,5,dimethyl-2,5-bis(t-butylperoxy)hexyne-3 (PX-1). The amount of peroxide and the cracking temperature depend upon the melt flows of the starting polymers and the desired melt flow of the final composition. If desired, the peroxide may be added in a masterbatch with mineral oil or other polymer. Typical amounts of peroxide are between about 150 parts by weight per million parts by weight total polymer (ppmw) and about 1000 ppmw, preferably between about 400 ppmw and about 700 ppmw. Typical cracking temperatures are between about 190° C. and about 250° C., preferably between about 220° C. and about 240° C.

The compositions of this invention may of course contain stabilizers and additives conventionally employed in similar polyolefin compositions, such as anti-oxidants, stabilizers against actinic radiation, antistatic additives, crystallinity nucleating agents, pigments and mineral fillers.

As shown in the examples which follow, there are advantages in certain cases in adding a nucleating agent, nucleation being a process well known in the art. See, e.g., U.S. Pat. Nos. 3,207,739 and 3,268,499, which are herein incorporated by reference. Acceptable nucleating agents include metal benzoates and alkyl substituted metal benzoates. Specific nucleating agents include sodium benzoate, aluminum benzoate, lithium benzoate, and magnesium benzoate, with sodium benzoate being most preferred. The amount of nucleating agent employed where desired is between about 0.1 and 0.5 percent by weight of the total composition, preferably between 0.3 and 2.0 percent by weight.

The compositions of the invention are suitable for the same uses as the commercially used impact-improved polypropylenes, e.g., for automobile trim parts, battery containers, tote boxes, crates, bottles, appliance parts and the like.

The invention is illustrated by the following examples. Unless otherwise stated, the blended compositions were prepared by dry-blending the propylene-ethylene sequential copolymer base stock with pelletized or granular LLDPE along with the peroxide as conveniently diluted with oil or with LDPE in a masterbatch. These mixtures were then extruded as strands and pelletized with either a 1-inch Killion or a 2½-inch Welex extruder. Test specimens of the blended compositions were made by injection molding with an Arburg reciprocating screw machine.

Mechanical properties were determined by standard tests, as indicated in the Examples.

Several different propylene-ethylene sequential copolymer base stocks and LLDPEs were employed in the examples. The five base stocks are described below in Table 1. Six different LLDPEs were employed in the examples; as defined in Table 2 below:

TABLE 1

| PP # | Copolymer Fraction, % | Ethylene Content of Copolymer Fraction, % w | Melt Flow, dg/min. ASTM D-1238 Cond. L |
|---|---|---|---|
| PP-1 | 14 | 45 | 4.9 |
| PP-2 | 14 | 45 | 3.5 |
| PP-3 | 14 | 45 | 4.5 |
| PP-4 | 14 | 45 | 10.8 |
| PP-5 | 14 | 45 | 4.2 |

TABLE 2

| PE # | Melt Index (ASTM D-1238 Cond. E), dg/min | Co-monomer type | Density g/cc | Source |
|---|---|---|---|---|
| PE-1 | 1 | butene-1 | 0.918 | A |
| PE-2 | 1 | octene-1 | 0.920 | B |
| PE-3; PE-4 | 5 | butene-1 | 0.934 | A/C |
| PE-5 | 12 | butene-1 | 0.926 | A |
| PE-6 | 0.6 | butene-1 | 0.918 | C |

A = Exxon
B = Dow
C = Union Carbide

TABLE 3

| Material No. | LLDPE Grade | % w | Base Copolymer | Blend Melt Flow dg/min | Tangent 0.05 in/min MPa | 1% Secant 0.05 in/min MPa | Gardner Impact −30° C. J (in-lb) | Peroxide Masterbatch |
|---|---|---|---|---|---|---|---|---|
| 1 | — | — | PP-1 | 4.9 | 1100 | 1055 | 1.8 (16.3) | 0 |
| 2 | — | — | PP-1 | 5.2 | 1075 | 1010 | 1.8 (16.2) | 0 |
| 3 | — | — | PP-1 | 16.1 | 967 | 956 | 3.1 (21.7) | 1 |
| 4 | — | — | PP-1 | 39.9 | 991 | 961 | 1.9 (17.0) | 3 |
| 5 | PE-1 | 20 | PP-1 | 6.7 | 899 | 874 | 30.1 (266) | 0.5 |
| 6 | PE-1 | 20 | PP-1 | 8.4 | 915 | 877 | 27.0 (239) | 1 |
| 7 | PE-1 | 20 | PP-1 | 17.8 | 816 | 790 | 12.8 (113) | 3 |
| 8 | PE-2 | 20 | PP-1 | 8.2 | 868 | 848 | 25.4 (225) | 1 |
| 9 | PE-2 | 20 | PP-1 | 17.9 | 815 | 788 | 3.6 (31.9) | 3 |
| 10 | PE-1 | 20 | PP-2 | 3.4 | 981 | 951 | 29.4 (260) | 0 |
| 11 | PE-2 | 20 | PP-2 | 4.0 | 999 | 957 | 27.9 (247) | 0 |

EXAMPLE 1

The LLDPE grades compared in this example were PE-1 and PE-2. Dry blends of 20%w of each LLDPE in PP-1 and PP-2 (not visbroken) medium impact propylene-ethylene sequential copolymers were prepared in accordance with compositions given in Table 3. For visbreaking experiments, PX-1 dialkyl peroxide was added as a concentrate (4.6%w of the commercial peroxide additive—latter 51% active—was diluted with LDPE) at levels of 0.5, 1, and 3%w concentrate basis total blend. It took nearly three times as much peroxide concentrate to crack the LLDPE-propylene copolymer blends to ca 16-18 dg/min as it did PP-1; hence, it can be concluded that a significant degree of LLDPE crosslinking takes place in the visbreaking process. All extrusions for blend preparation or simultaneous cracking were conducted on a 1-inch Killion extruder, and injection molding of ASTM specimens and impact discs was carried out on an Arburg (Model 221/55/250) machine. Physical property measurements are shown in Table 3.

Materials 5-7 show that good impact strength is retained on visbreaking the composition with PE-1 (butene-1 co-monomer) to ca 18 dg/min. Materials 8 and 9 show that PE-2 (octene-1 co-monomer) is a less effective impact modifier for visbroken compositions.

EXAMPLE 2

In another set of experiments, a series of six letdowns of 4, 8, 12, 16, 20, and 24%w PE-4 LLDPE in PP-3 medium impact copolymer polypropylene, chemically cracked to ~22 dg/min melt flow were prepared on a 2½" Welex extruder. An unmodified sample of PP-3 chemically cracked to ~22 dg/min was also prepared. Injection molded ASTM specimens and impact discs were made from the samples, and physical properties were measured. Results are shown in Table 4. The data indicate that the impact strength of the hybrid samples generally increases with the higher loadings of LLDPE. The stiffness of the samples, however, decreases especially at the higher LLDPE levels. Weld line strength appears to be satisfactory up to a LLDPE level of 16%w.

In comparison to the other examples the visbroken base copolymer Gardner impact result (ca-30° C.) is a factor of 3 or more greater (material 15); hence, the visbroken LLDPE blend compositions gave correspondingly high Gardner toughness values.

TABLE 4

| Properties/Samples | #15 | #16 | #17 | #18 | #19 | #20 | #21 |
|---|---|---|---|---|---|---|---|
| Weight percent PE-4 | 0 | 4 | 8 | 12 | 16 | 20 | 24 |
| Melt Flow; dg/min | 22.0 | 22.1 | 25.8 | 24.8 | 23.3 | 21.5 | 19.7 |
| Tensile Yield | | | | | | | |
| Strength @ 0.2 MPa: | 24.9 | 23.9 | 21.9 | 21.2 | 20.8 | 21.0 | 19.8 |
| in/min; psi | 3610 | 3470 | 3180 | 3070 | 3020 | 3050 | 2870 |
| 1% Secant Modulus MPa: | 1250 | 1140 | 1050 | 1020 | 986 | 965 | 841 |
| @ 0.2 in/min; psi | 181,000 | 165,000 | 152,000 | 148,000 | 143,000 | 140,000 | 122,000 |
| Tensile Yield | | | | | | | |
| Strength @ 2.0 MPa: | 27.0 | 25.9 | 25.1 | 24.3 | 23.9 | 23.6 | 22.7 |
| in/min; psi | 3910 | 3760 | 3640 | 3530 | 3460 | 3430 | 3290 |
| Yield Elongation @ | 7.3 | 7.3 | 7.7 | 8.4 | 8.6 | 8.6 | 9.7 |
| 2.0 in/min; % | | | | | | | |
| Secant Flexural | | | | | | | |
| Modulus @ 0.05 MPa: | 1010 | 993 | 903 | 883 | 841 | 807 | 807 |
| in/min; psi | 147,000 | 144,000 | 131,000 | 128,000 | 122,000 | 117,000 | 117,000 |
| Heat Deflection | 195 | 175 | 185 | 187 | 177 | 163 | 182 |
| Temp. @ 66 psi; °F. | | | | | | | |
| Unnotched Izod Impact Strength @ −18° C.; ft-lb/in | 16.7 | 20.1 | 19.3 | 20.7 | 23.0 | 26.9 | 25.9 |
| Gardner Impact Strength | | | | | | | |
| @ −18° C.; in-lb | 108 | 170 | 199 | 177 | 190 | 209 | 272 |
| @ −29° C.; in-lb | 56 | 93 | 104 | 158 | 170 | 177 | 192 |
| DIF @ −29° C.; ft-lb/in | 67 | 142 | 118 | 148 | 225 | 206 | 235 |
| Hardness, Rockwell "R" | 89 | 85 | 80 | 78 | 76 | 72 | 69 |
| Weld Line Strength, % | 8.9 | 7.7 | 6.7 | 5.5 | 5.0 | 4.5 | 3.9 |

EXAMPLE 3

In an additional set of experiments, three LLDPE grades, including PE-1, PE-3, and PE-5, were compared in letdowns of 15%w in PP-4, an ca 11 dg/min medium impact propylene-ethylene sequential copolymer. Excepting control runs, these compositions, some also containing a nucleating agent (sodium benzoate as a 50:50 concentrate in polypropylene homopolymer), were chemically visbroken on a 1-inch Killion extruder with PX-1 (used as a concentrate in either LDPE or mineral oil—latter 20% active in peroxide). Melt flows ranged from about 18 to 70 dg/min for the visbroken blends. As in Examples 1 and 2, injection molded ASTM specimens and impact discs were made and tested, with results shown in Table 5.

These findings show that PE-1, a 1 dg/min PE, is better in Gardner impact than PE-5, a 12 dg/min PE, for unnucleated visbroken compositions (compare materials 4 and 9). When nucleated, Gardner toughness values rank the PE's: PE-3>PE-5>PE-1, from best to worst (compare materials 2, 6 and 8). It should also be noted that the PE's rank in the order: PE-1>PE-3>PE-5 (in the order of increasing melt index in accordance with my copending patent application Ser. No. 444,754, filed Nov. 26, 1982, having a common assignee) for Gardner toughness of non-visbroken blends (compare materials 1, 5 and 7). In all instances, nucleating improved the stiffness of visbroken compositions as measured by tensile and flexural properties (compare materials 2, 4, and 8, 9). At the same time, nucleating lowered the tensile elongation to break, which for PE-1 was reduced to ca 26%, a value which could prove unacceptable for some end-use applications. As a general characteristic though, the visbroken compositions based on 11 dg/min copolymer exhibited good elongations to break, and toughness exceeded that of the base copolymer alone. At very high product melt flows, e.g., 70 for material 3, visbreaking is very deleterious to properties as a whole, and such compositions cannot be viewed as useful products of commerce.

TABLE 5

| MATE-RIAL No. | MELT FLOW dg/min | LLDPE (15% w) | PEROXIDE CONC. % w LDPE Base | PEROXIDE CONC. % w Oil Base | FLEXURAL MODULUS, 0.05 in/min 1% Sec., MPa | FLEXURAL MODULUS, 0.05 in/min Tan., MPa | TENSILE PROPERTIES, 2 in/min Yld. Str., MPa | TENSILE PROPERTIES, 2 in/min Yld. El., % | TENSILE PROPERTIES, 2 in/min Brk El., % | GARDNER IMPACT, −30° C. J (in-lb) |
|---|---|---|---|---|---|---|---|---|---|---|
| 1 | 8.4 | PE-1 | — | — | 1000 | 1110 | 24.5 | 9.0 | >388 | 17.8 (157) |
| 2-Nuc.* | 18.2 | PE-1 | 2 | — | 946 | 1040 | 22.4 | 7.1 | 25.9 | 3.8 (33.5) |
| 3-Nuc. | 69.8 | PE-1 | — | 0.5 | 915 | 1010 | 20.8 | 5.1 | 6.5 | 0.5 (4.6) |
| 4 | 19.8 | PE-1 | 2 | — | 827 | 881 | 22.0 | 8.5 | 63.9 | 6.1 (54.0) |
| 5 | 10.7 | PE-3 | — | — | 1010 | 1090 | 25.3 | 10.5 | >329 | 4.9 (43.8) |
| 6-Nuc. | 26.3 | PE-3 | 2 | — | 990 | 1045 | 24.1 | 8.1 | 65.4 | 6.6 (58.5) |
| 7 | 10.7 | PE-5 | — | — | 967 | 1050 | 24.6 | 10.8 | 364 | 3.1 (27.7) |
| 8-Nuc. | 26.2 | PE-5 | 2 | — | 958 | 1010 | 24.2 | 8.7 | 170 | 4.8 (42.4) |
| 9 | 19.1 | PE-5 | 2 | — | 868 | 911 | 23.8 | 9.8 | 305 | 2.9 (25.8) |
| 10 | 10.8 | BASE-PP-4 | — | — | 1120 | 1200 | 27.6 | 7.2 | >290 | 2.0 (17.7) |
| 11 | 32.5 | BASE-PP-4 | 2 | — | 979 | 991 | 25.8 | 8.3 | 112 | 2.2 (19.7) |

*Nucleation performed with a melt compounded 50:50 blend of sodium benzoate and 300 dg/min PP homopolymer as used at 1% w in each of the indicated compositions.

EXAMPLE 4

In a further set of experiments, PE-4 was compared to PE-6 in letdowns of 14%w in PP-5 that were then visbroken under conditions used in the preceding examples. Results of testing ASTM specimens and impact discs are shown in Table 6. It is evident that although material 1 with PE-4 was visbroken to a higher melt flow than material 2 containing PE-6, the former exhibits greater Gardner impact strength (material 2 is actually worse than the PP-5 base copolymer). This is contrary to the usually inverse relationship between impact product melt flow and toughness (see material 3 in Table 5); hence, it shows that PE-4 is substantially better than PE-6 under visbreaking conditions. The converse has been shown to be true when such compositions are tested "as is", without visbreaking (see copending application referred to above). In this comparison, notched Izod impact is directionally better for material 2 with PE-6, as would normally be expected. Since tensile elongations to break are low for both materials, it is reasonable to conclude that end-uses requiring greater ductility (elongation) would be better served by compositions based on a higher melt flow sequential propylene-ethylene copolymer (see Example 3).

TABLE 6

| Material No. | 1 | 2 | 3 |
|---|---|---|---|
| PE Grade | PE-4 | PE-6 | Base Copolymer |
| PE Level, % w | 14 | 14 | 0 |
| Peroxide-Oil Conc., % w | 0.25 | 0.25 | 0 |
| Melt Flow, dg/min. | 31 | 20 | 4.8 |
| Flex. Mod., 0.05 in/min | | | |
| 1% Secant, MPa | 880 | 856 | 1160 |
| Tangent, MPa | 923 | 921 | 1200 |
| Tensile Properties, 2 in/min | | | |
| Yield Strength, MPa | 23.3 | 21.8 | 27.4 |
| Yield Elong., % | 8.1 | 6.7 | 7.9 |
| Break Elong., % | 17.5 | 13.2 | 239 |
| Notched Izod Impact | | | |
| 23° C., J/m | 64 | 71 | 82 |
| 0° C., J/m | 33 | 35 | 31 |
| −18° C., J/m | 27 | 32 | 31 |
| Gardner Impact (125 mil disc) | 5.4(48.1) | 0.9(8.3) | 2.1(18.6) |

TABLE 6-continued

| Material No. | 1 | 2 | 3 |
|---|---|---|---|
| −30° C., J (in-lb) | | | |

What is claimed is:

1. A composition having a melt flow between about 5 and about 50 dg/min (ASTM D1238-Condition L), and a high impact value, said composition being obtained by visbreaking the blend of 50-95% by weight of an impact-modified propylene polymer and 5-50% by weight of a linear low density ethylene copolymer, wherein:
   (a) said impact-modified propylene polymer has a melt flow (ASTM D1238-Condition L) of about 0.5 to 15 dg/min and an elastomeric propylene-ethylene copolymer content of 5-50% by weight, the copolymer fraction having an ethylene content of 30-95% by weight, which propylene polymer is the product of sequential polymerization of propylene and a propylene-ethylene mixture over a titanium halide-containing coordination catalyst; and
   (b) said linear low density ethylene copolymer is the product of polymerization of ethylene with up to 15 mole percent of at least one $C_3$-$C_8$ alpha olefin monomer over a transition metal-based coordination catalyst and which has a density in the range from 0.912 to 0.940 and a melt index (ASTM D1238-Condition E) in the range from 1 to 7.

2. The composition according to claim 1 wherein said linear low density ethylene copolymer is an ethylene-1-butene copolymer.

3. The composition according to claim 1 wherein said sequential propylene-ethylene copolymer has a melt flow (ASTM D 1238 Cond. L) between about 4 and 12 dg/min.

4. The composition according to claim 1 wherein a nucleating agent is added prior to visbreaking to improve stiffness and ease of melt processing.

5. Impact modified polypropylene compositions according to claim 4 wherein sodium benzoate is used as said nucleating agent in a melt mixed concentrate with polypropylene to improve nucleant dispersion.

6. The composition according to claim 1 wherein said composition is obtained by visbreaking the blend of 70 to 90 percent by weight of an impact-modified propylene polymer and 30 to 10 percent by weight of a linear low density ethylene copolymer.

7. The composition according to claim 4 wherein the amount of said nucleating agent is 0.1 to 5.0 percent by weight of said composition.

8. The composition according to claim 4 wherein said nucleating agent is selected from the group consisting of metal benzoates and alkyl substituted metal benzoates.

9. The composition according to claim 1 wherein the visbreaking is accomplished by extruding said propylene polymer and said linear low density ethylene copolymer in the presence of a peroxide.

10. The composition according to claim 9 wherein the amount of peroxide employed is between about 150 and 1000 parts by weight per million parts by weight total polymer in said composition.

11. The composition according to claim 9 wherein said peroxide is 2,5-dimethyl-2,5-bis(t-butylperoxy)hexene.

12. The composition according to claim 9 wherein said visbreaking takes place at a temperature between about 190° C. and 250° C.

* * * * *